United States Patent [19]

Sorensen et al.

[11] Patent Number: 5,197,194
[45] Date of Patent: Mar. 30, 1993

[54] SHEARS WITH REMOVABLE BLADES

[76] Inventors: Joseph A. Sorensen, 6533 Sundance Ct., Lincoln, Nebr. 68512; Anthony B. Fuller, 302 S. Pear St., DeWitt, Nebr. 68341

[21] Appl. No.: 860,975
[22] Filed: Mar. 31, 1992
[51] Int. Cl.[5] ............................................. B26B 13/04
[52] U.S. Cl. ...................................... 30/260; 30/254; 30/349
[58] Field of Search .................. 30/254, 260, 353, 349

[56] References Cited

U.S. PATENT DOCUMENTS

| | | | |
|---|---|---|---|
| 1,270,683 | 6/1918 | Applebaum | 30/353 |
| 1,507,614 | 9/1924 | Miller | 30/260 |
| 2,009,502 | 7/1935 | Lambert | 30/260 |
| 2,082,502 | 6/1937 | McCaw | 30/349 |
| 2,801,468 | 8/1957 | Anderson | 30/260 |
| 3,237,501 | 3/1966 | Hottendorf | 30/349 |
| 3,670,415 | 6/1972 | Rose | 30/349 |
| 4,574,673 | 3/1986 | Pearl | 30/349 |

*Primary Examiner*—Frank T. Yost
*Assistant Examiner*—Hwei-Siu Payer

[57] ABSTRACT

A hand tool comprising two cooperating members each having a handle and interconnecting arrangement for interconnecting the members in mutually overlapping relationship so as to permit movement of the members relative to one another by the handles.

At least one of the cooperating members is provided with a receiving unit adapted to movably receive a blade. The receiving unit is defined by at least an interior part thereof.

The blade comprises an elongated body having first and second cutting portions spaced from each other by a central portion. The first cutting portion is defined by at least a first cutting edge and a first rear portion. The second cutting portion is defined by at least a second cutting edge and a second rear portion.

The blade is positioned within the receiving unit of the cooperating member in such a manner that the first cutting edge faces the other cooperating member and the second cutting edge faces the interior part of the receiving unit.

8 Claims, 9 Drawing Sheets

SHEARS WITH REMOVABLE BLADES

FIELD OF THE INVENTION

This invention relates to hand tools and more specifically to hand-operated metal cutting shears.

BACKGROUND OF THE INVENTION

Conventional metal cutting shears have been used in industry for many years. It is widely recognized that among substantial drawbacks of this tool are: a short life span, relatively heavy weight and difficulty to operate, especially when a wide angle of an opening between the cutting edges is required.

Conventional metal cutting shears are usually manufactured with the blades permanently attached to hand levers. If at least one blade of such shears is ruined, the entire hand tool becomes unacceptable for further use and should be discarded. One way to solve this problem is to provide the shears with removable blades. An example of such metal cutting shears with removable blades is described in U.S. Pat. No. 2,801,468 to Anderson. In view of the removable nature of the blades, the life span of the Anderson tool is longer than that of the conventional shears with the permanent blades. However, each Andersen blade is designed with only one cutting edge and should be completely replaced a soon as such single cutting edge is ruined.

Furthermore, in some instances removal and replacement of the blades in the Andersen patent could be time-consuming and expensive in view of the plurality of the fasteners used for connection between the jaws and the blades.

To alleviate the above drawbacks, the present invention provides a removable blade with two cutting edges designed in such a way that while one blade is used, the other is kept protected within the interior part of the lever. The second blade can be easily substituted for the first one when it is necessary.

Furthermore, in the present invention the shears are designed to prevent the blades from sliding out from their engagement with the jaws. In view of that, the need for additional fasteners for connection between the blade and the jaw is substantially reduced.

Still further, this invention provides for a novel way of operating the metal cutting shears at a wide angle opening between the cutting edges.

BRIEF SUMMARY OF THE INVENTION

According to one aspect, the present invention provides a hand tool comprising two cooperating members each having a handle and an interconnecting arrangement for interconnecting the members in mutually overlapping relationship so as to permit movement of the members relative to one another by the handles.

At least one of the cooperating members is provided with a receiving unit adapted to movably receive a blade. The receiving unit is defined by at least an interior part thereof.

The blade comprises an elongated body having first and second cutting portions spaced from each other by a central portion. The first cutting portion is defined by at least a first cutting edge and a first rear portion. The second cutting portion is formed by at least a second cutting edge and a second rear portion.

The blade is positioned within the receiving unit of the cooperating member in such a manner that while the first cutting edge projects outwardly to face the other cooperating member, the second cutting edge faces the interior part of the receiving unit.

According to another aspect, the present invention discloses a blade for a hand tool comprising, an elongated body defined by at least first and second exterior portions which are opposite to each other.

First and second cutting portions are provided in the blade and spaced from each other by a central portion.

The first cutting portion is formed by at least a first cutting edge and a first rear portion. The second cutting portion is defined by at least a second cutting edge and a second rear portion. The first and second cutting edges extend in opposite directions from the central portion in such a manner that the first cutting edge and the second rear portion define at least a part of the first exterior portion and the second cutting edge and the first rear portion define at least a part of the second exterior portion.

BRIEF DESCRIPTION OF THE DRAWINGS

Other advantages and features of the invention are described with reference to exemplary embodiments, which are intended to explain and not to limit the invention, and are illustrated in the drawings in which.

DESCRIPTION OF THE ILLUSTRATIVE EMBODIMENT

Although a specific embodiment of the invention will now be described with reference to the drawings, it should be understood that the embodiment shown is by way of example only and merely illustrative of but one of the many possible specific embodiments which can represent applications of the principles of the invention. Various changes and modifications, obvious to one skilled in the art to which the invention pertains, are deemed to be within the spirit, scope and contemplation of the invention and are further defined in the appended claims.

Figure 1:
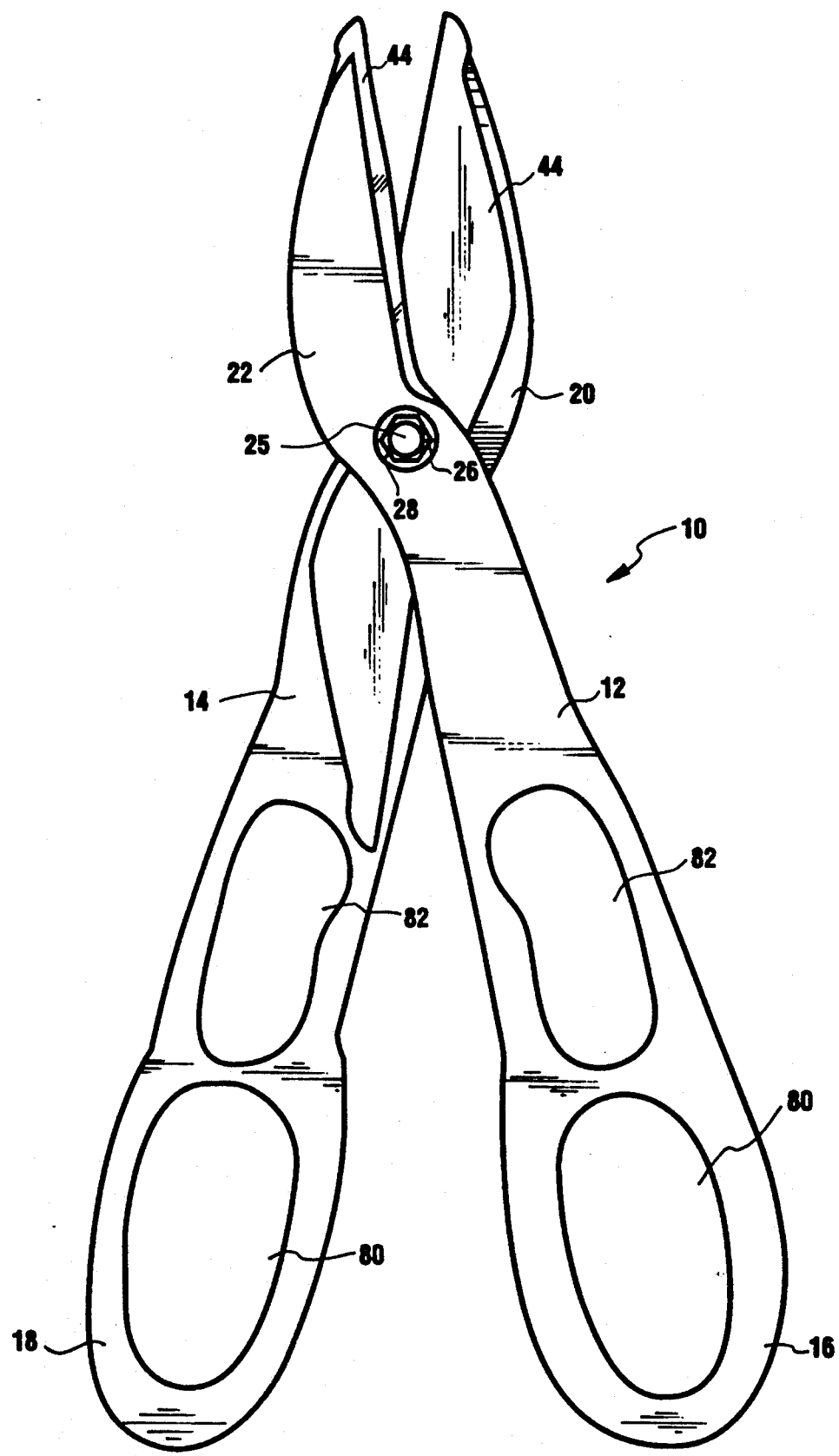
FIG. 1 is a front elevational view of the shears with removable blades.
Figures 2, 2A:
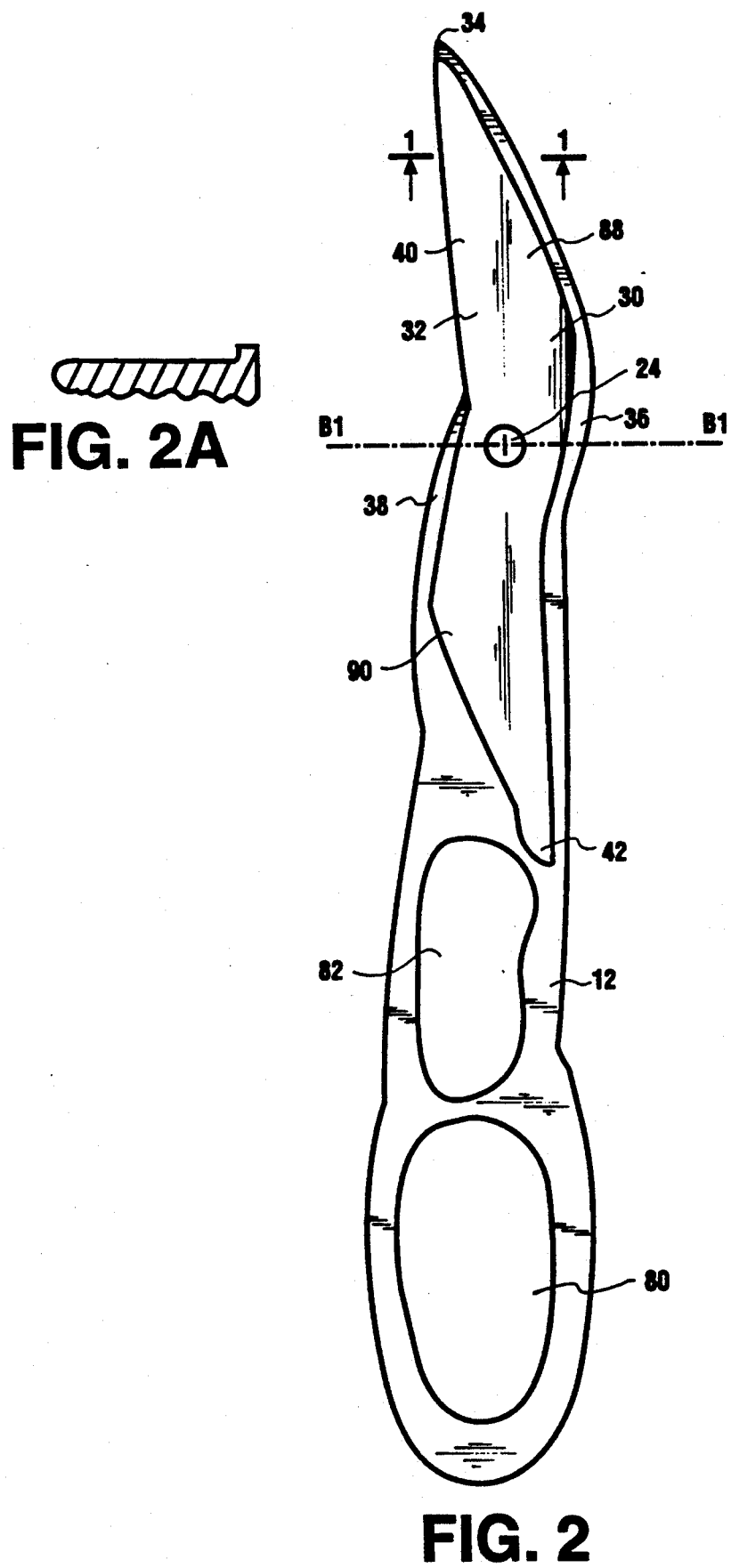
FIG. 2 is an elevational view showing a cooperating member or lever.
FIG. 2a is a cross-sectional view according to the sectional line 1—1 of FIG. 2.
Figure 4:
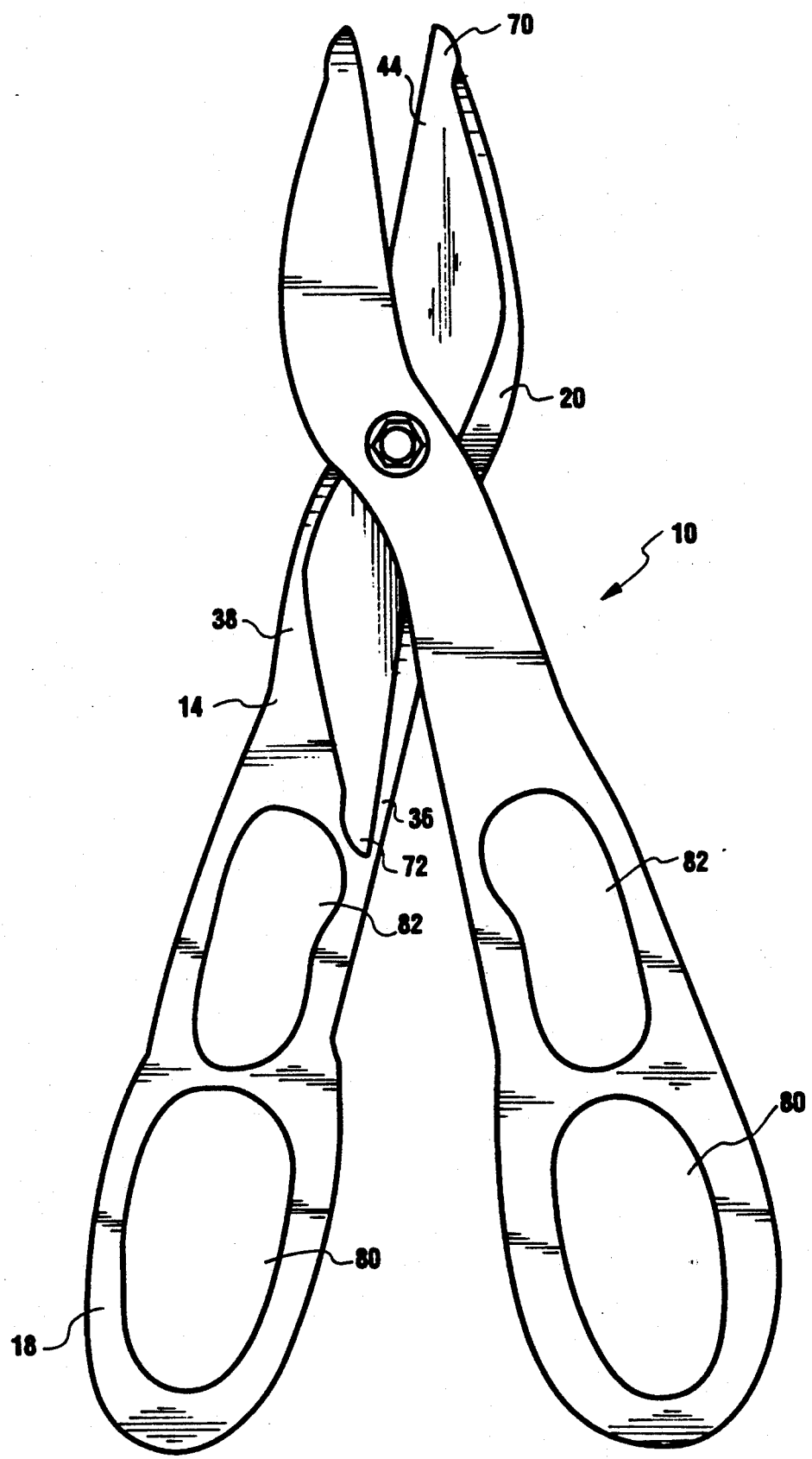
FIG. 4 is an elevational view showing shears with one removable blade.

With reference to the drawings, an illustrative embodiment of the metal cutting shears in accordance with the present invention indicated generally by the numeral 10 is best illustrated in FIGS. 1, 2 and 4. The shears embodying this invention comprises a pair of substantially identical levers or cooperating members 12 and 14; each cooperating member in turn consists of a handle (16 and 18) and a jaw section (20 and 22). A pivot pin or interconnecting means 25 is provided for interconnecting the cooperating member in mutually overlapping relationship, so as to permit movement of these members relative to one another. The pivot pin 25 is typically secured in place by a conventional nut 26 and a spring washer 28. However, any other conventional way of movably interconnecting the cooperating members is contemplated by this invention.

The typical jaw section 30 of the cooperating member is best illustrated in FIGS. 2 and 2a. The jaw section 30 of each lever has the face thereof recessed to provide a cutting-blade pocket or receiving means 32. The pocket typically extends from the forward tip 34 of the jaw section, passing the pivot pin aperture 24, to an area adjacent finger loops of the handle. The form of the pocket 32 leaves a narrow flange 36 along the outer curved perimeter and similar flange 38 along a portion of the inner perimeter of the jaw 30. It is shown in FIG. 2 that the flange 36 extends from the tip 34 of the lever substantially along the entire length of the jaw portion, whereas the flange 38 starts in the vicinity of the pivot pin aperture 24 leaving a substantially unobstructed open end area 40 in the inner perimeter of the jaw section. It will be discussed hereinbelow that a cutting edge of the blade extends outwardly through the opening 40 for mutually cooperating with the cutting edge of the other blade. At its inner end the recess 32 terminates at a junction of the flanges 36 and 38 defining the elongated pocket 42 which is adapted to receive one tip of the blade.

Figure 3B:
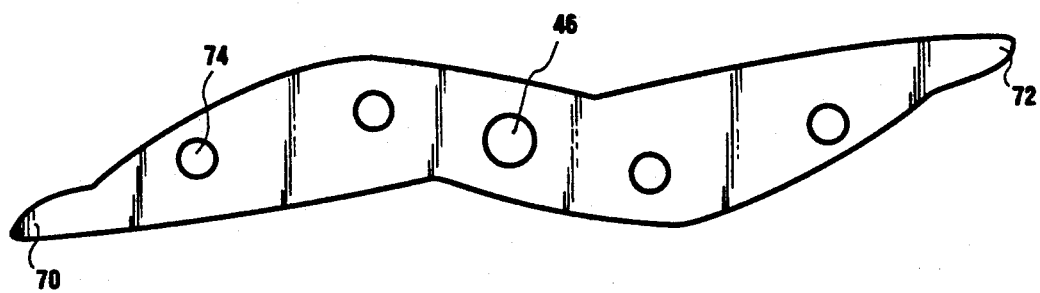
FIG. 3b is an elevational view of another embodiment of the blade.
Figure 3A:
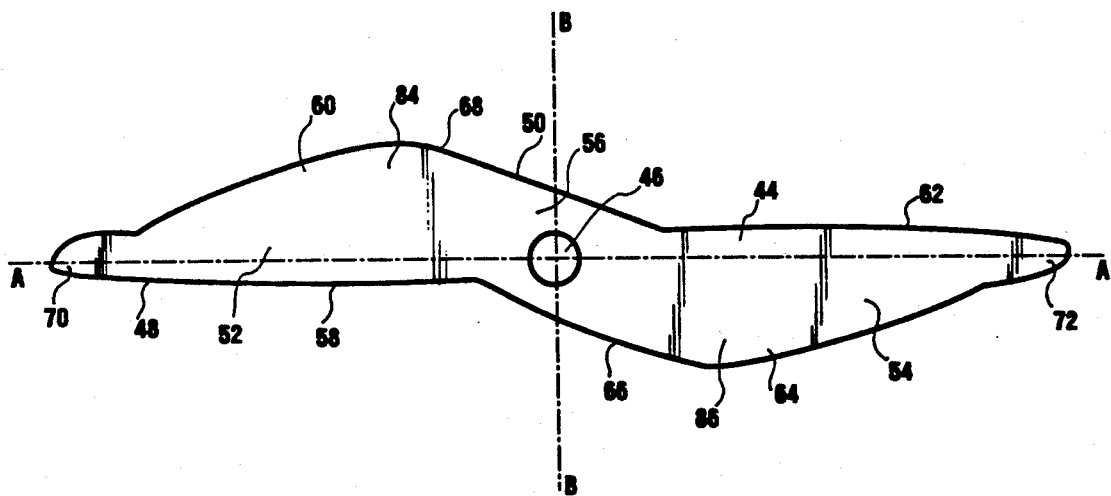
FIG. 3a is a front elevational view of the blade.

The typical blade 44 of the invention having a longitudinal axis A—A and transverse axis B—B is most clearly shown in FIG. 3a. The blade is substantially symmetrical about its transverse axis B—B and is shaped to conform with the receiving means or pocket 32. A hole 46 is provided within the blade for registration with the pivot pin aperture 24 of the jaw portion. The outside contour of the blade is formed by first 48 and second 50 exterior portions opposing each other. A body of the blade includes first 52 and second 54 cutting portions spaced from each other by a central portion 56. The first cutting portion is formed by at least a first cutting edge 58 and a first rear portion 60. The second cutting portion 54 consists of a second cutting edge 62 and the second rear portion 64. The first and second cutting edges extend longitudinally in opposite directions from the central portion in such a manner that the first cutting edge 58 and the second rear portion 64 define at least a part of the first exterior portion 48 of the body. Similarly, the second cutting edge 62 and the first rear portion 60 represent at least a part of the second exterior portion 50.

In the embodiment of FIGS. 3a and 3b, an exterior of the central portion is formed by two substantially straight sides 66 and 68 which are positioned at an angle to the corresponding cutting edges 58 and 62. It should be noted, however, that any other suitable configuration of the central portion is within the scope of the present invention.

FIGS. 3a and 3b illustrate piercing portions 70 and 72 positioned at the ends of the blade. While it is useful to provide the shears with the part capable of piercing a hole in a thin sheet of metal, it is within the scope of this invention to use the blades without such piercing portions.

The receiving means or cutting blade pocket 32 is designed to closely accommodate the blade. It is shown in FIG. 1 that when the blade is positioned within the receiving means, the first cutting edge 58 extends through the opening 40 to face the blade of the other cooperating member. Meanwhile, the second cutting edge 62 as well as the entire second cutting portion 54 are positioned within the interior of the receiving means and this cutting edge is protected by the flange 36 from undesirable exposure.

The first rear portion 60 of the blade in combination with the side 68 of the central portion form a first bulge 84 which projects outwardly in one direction from the longitudinal axis A—A of the blade. Similarly, the second rear portion 64 and the side 66 of the central portion define a second bulge 86 extending outwardly from the longitudinal axis A—A in the direction opposite to the direction of the first bulge. The cutting blade pocket or receiving means 32 is provided with two concave areas 88 and 90 which are designed to closely receive the first and second bulges of the blade. When the blade is positioned within the interior of the lever, engagement between the bulges and the concave areas locks the blade within the receiving means, preventing it from sliding out. This creates effective locking means, significantly simplifying assembly of the shears (including replacement of the blade).

During the assembly procedure both cooperating members are usually positioned with their cutting-blade pockets facing an upward direction. Then, each blade is inserted into the corresponding pocket from the top, so that the locking means secures the blades with the receiving means, preventing them from sliding outwardly. Preassembled in this way cooperating members are brought together and interconnected by the pivot pin.

In the assembled condition of the shears, when the levers and the blades are kept together by the pivot pin, the blades are in close contact with each other and with the receiving means of the corresponding levers. No additional fasteners have been typically required by such construction.

However, other ways of securing the blade within the blade pocket of the lever should be considered. For example, FIG. 3b illustrates a plurality of small apertures 74 registering with similar apertures provided in the recessed jaw sections. These smaller registering apertures allow for insertion of fasteners which removably secure the cutting blade in place in the blade pocket. The fasteners may be of Allen, Phillips common screws or of any other desired conventional type.

In the assembled condition of the metal cutting shears 10, the blade 44 is positioned within the receiving means and the first cutting edge 58 projects through the opening 40 for cooperation with the other blade. At the same time, the second cutting edge 62 is situated within the interior of the receiving means and protected from undesirable contacts and exposure by the flange 36. When the first cutting edge becomes dull or ruined, it is possible in the present invention to substitute the untouched cutting edge for the unusable first one. To perform this task, the pivot pin 24 is removed and the shear taken apart in order to gain access to the receiving means of the cooperating members. Then, the blade 44 is released from its engagement with the receiving means and moved in such a manner that the second cutting portion 54 is substituted within the receiving means for the first cutting portion 52. Such substitution is possible in view of the symmetrical configuration of the blade. When the replacement task is accomplished the sharp second cutting edge 62 is positioned within the opening 40 and the unusable first cutting edge 58 is situated within the interior of the receiving means.

FIG. 1 illustrates the shears with both replaceable blades having two cutting edges. However, the hand tool with one blade permanently attached to the lever and one blade replaceable, is within the scope of this invention. Such combination shears is illustrated in FIG. 4.

As is conventional with metal cutting shears, each handle section 16 and 18 terminate at its rear end in a hand-grip loop 80. In use, the thumb of the operator's hand is inserted into the handgrip loop 80 on one of the levers and at least two of the remaining fingers of the same hand are inserted into the hand-grip loop 80 of the other lever.

In operation of the metal cutting shears, it is sometimes imperative to open the angle between the cooperating cutting edges as wide as possible. To perform this task, the normal tendency for the operator is to insert the thumb in one loop 80 positioned at the very end of the handle and at least insert two other fingers of the same hand into the identical loop 80 of the other handle.

As a matter of common experience, it is known that the further the loops are positioned from the pivot point, the more difficult it is for the operator using one hand to spread the blades wide open. Conversely, the closer the hand-grip loops are positioned to the pivot point, the less difficult it is to achieve a wider angle between the blades of the shears when one hand is used by the operator. Therefore, it is not uncommon, especially for an inexperienced operator, to strain his hand during repeated use of the conventional shears when the hand-grip loops are positioned at the very end of the handles, and the wide angle of the opening between the cutting blades is required.

To alleviate this problem, the invention provides for additional sets of hand-grip loops 82 which are positioned within the handles adjacent to the loops 80 and extended forwardly in the direction of the pivot pin 24. The loops 82 have an elongated configuration and are capable of receiving two or three fingers of the hand of the operator.

If, a wider angle opening is required during operation of the metal cutting shears according to the present invention, the user inserts his thumb into one of the elongated hand-grip loops 82, allowing the other three fingers of the same hand to be inserted into the corresponding loop 82 of the other handle. Since the loops are positioned closer to the pivot point than the loops 80, the operator can achieve the wider angle of the opening with less effort and strain to his hand.

When the metal cutting shears of the invention are used in a conventional way, that is, when the loops 80 are utilized, the loops 82 can be used for accommodating the index finger of the operator's hand. Then, the other three fingers of the same hand are inserted through the loop 80 of the same handle, whereas the thumb is inserted in the loop 80 of the corresponding handle. In this regard, the operator gets adequate leverage from his hand and the index finger is protected against any contact with and injury from the rough advancing metal as it is being cut.

FIGS. 5-9 illustrate application of the removable blade concept of the present invention to offset metal cutting shears.

Figure 5:
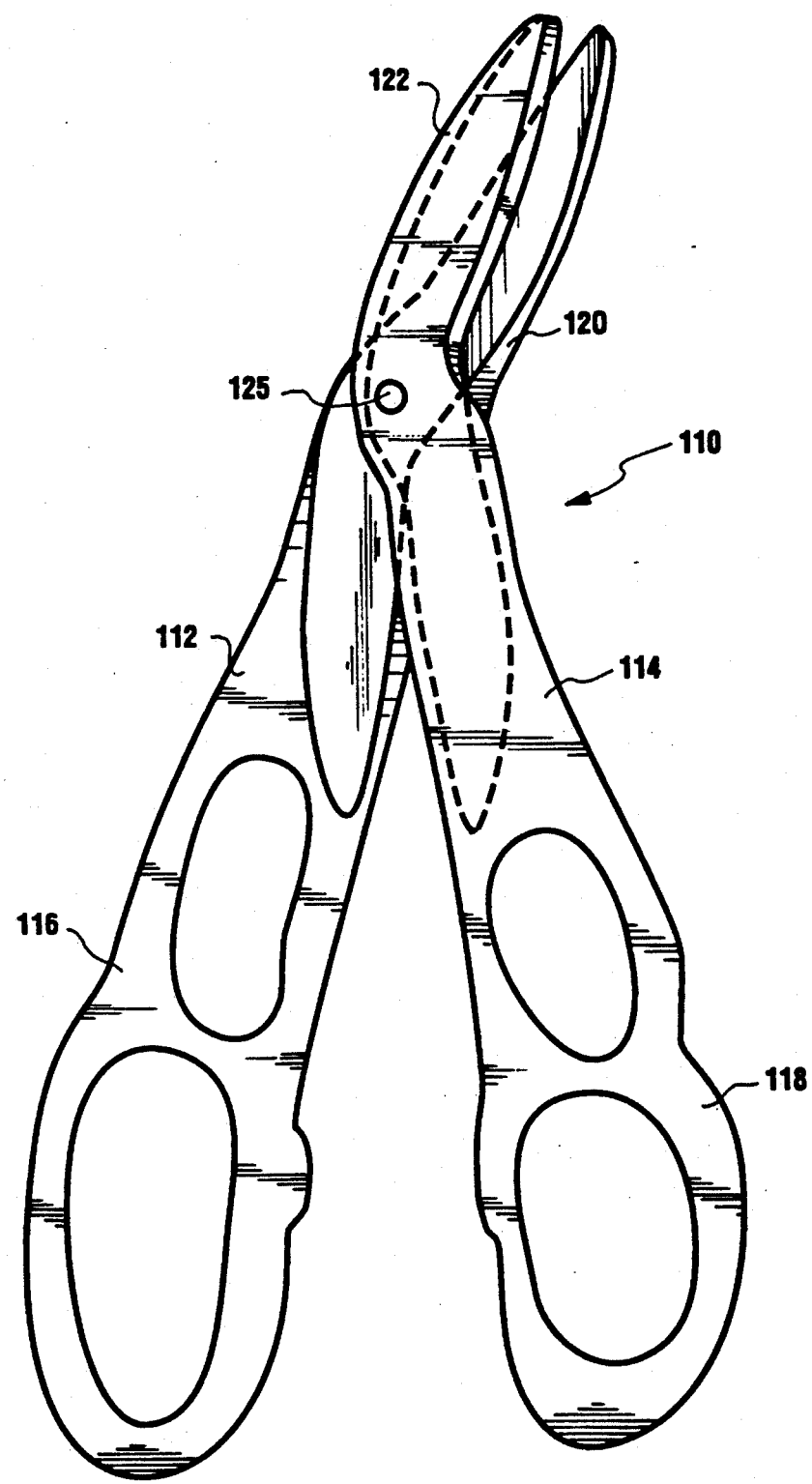
FIG. 5 illustrates the application of the removable blade to the off-set cutting shears.

It is shown in FIG. 5 that the offset metal cutting shears 110 consists of two levers or cooperating members (112 and 114), wherein each lever has its own configuration. Each cooperating member consists of a handle (116 and 118) and a jaw section (120 and 122). The cooperating members are connected by a pivot pin or interconnecting means (125), so as to permit movement of these members relative to one another. It was discussed hereinabove that any construction of interconnecting means is within the scope of this invention.

Figure 6:
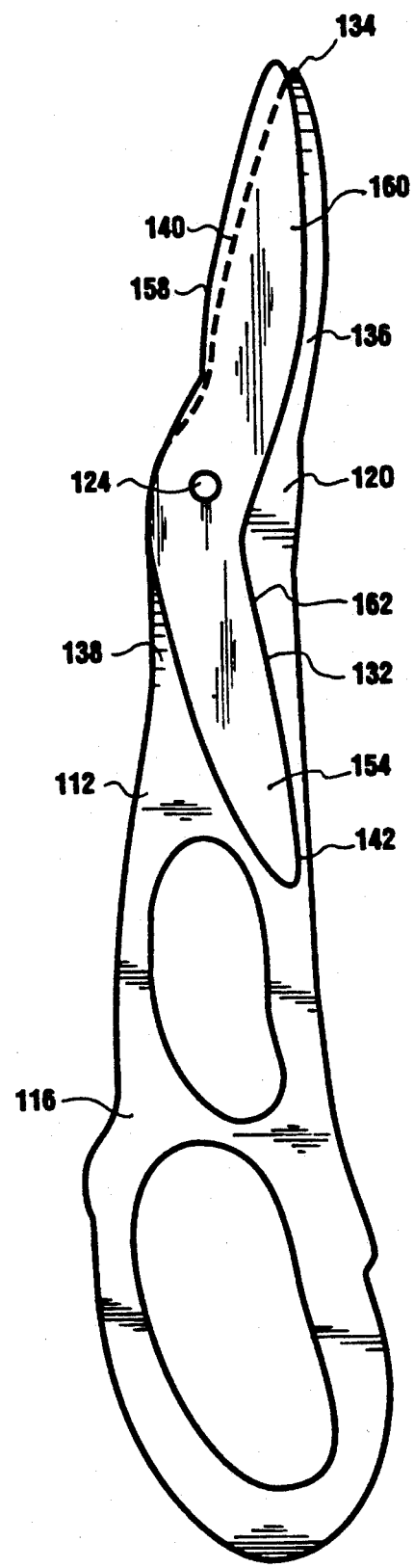
FIG. 6 is an elevational view showing one cooperating member of the cutting shears of FIG. 5.

FIG. 6 illustrates that a substantially straight lined jaw section (120) of the cooperating member (112) extends outwardly from the handle portion (116). The jaw section is recessed to provide a cutting-blade pocket or receiving means (132). The pocket extends from the forward tip (134) of the jaw, passing the pivot pin aperture (124) to an area which is adjacent to the finger loop portions. The pocket (132) is formed to have a flange (136) extending along the outer perimeter of the lever (112). A flange (138) is positioned along a portion of the inner perimeter of the lever. In the embodiment of FIG. 6, the flange (138) extends from the finger loop portions up to the vicinity of the pin aperture (124). This construction leaves a substantially unobstructed open area (140) in the outer perimeter of the jaw section. The flange (136) extends from the tip (134) of the lever substantially along the outer perimeter of the jaw portion. At its inner end, the recess (132) terminates at a junction of the flanges (136 and 138) defining an elongated pocket (142) which is adapted to receive one end of the blade.

Figure 7:
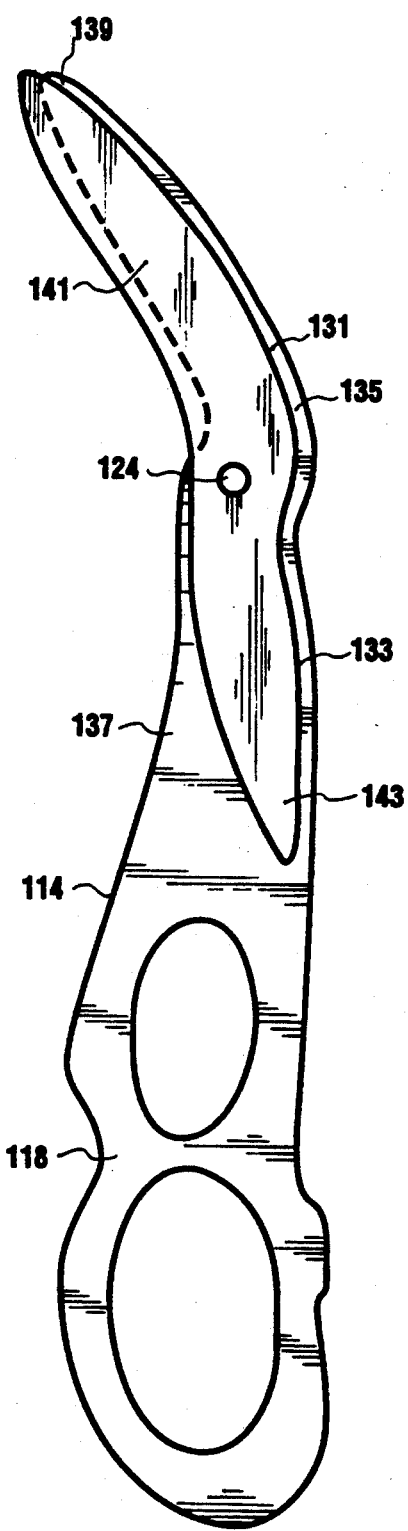
FIG. 7 is an elevational view showing another cooperating member of the shears shown in FIG. 5.

FIG. 7 shows the lever (114) having the jaw section (131) positioned at an angle to the handle (118).

The jaw section (131) is provided with a cutting-blade pocket or receiving means (133) which is adapted to receive a blade. The cutting-blade pocket (143) is formed by an exterior flange (135) extending from a forward tip (139) along the outer curved perimeter of the jaw section. A flange (137) extends from the vicinity of the pivot pin aperture (124) downwardly in the direction of the finger loops leaving a substantially open area (141) in the inner perimeter of the jaw section allowing the cutting edge of the blade to extend outwardly from the open end area (141) for engagement with the corresponding blade.

Figure 8:
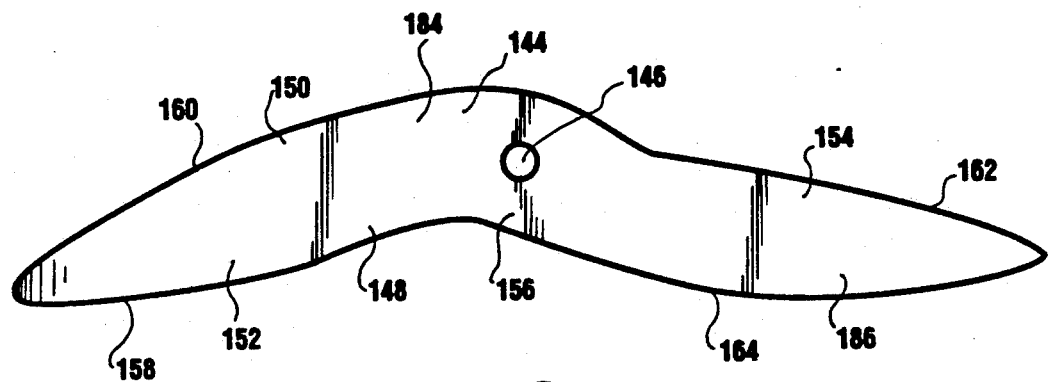
FIG. 8 is an elevational view showing a blade useable with the shears shown in FIG. 5.

Both levers of the offset metal cutting shears of FIG. 5 utilize substantially identical blades. An example of this blade is illustrated in FIG. 8. The blade (144) is shaped to conform with the receiving means or pockets (132 and 133). A hole (146) is situated within a central part of the blade to register with the pivot pin aperture (124) of the jaw portion(s). The exterior periphery of the blade is formed by first (148) and second (150) exterior portions opposing each other. A body of the blade includes first (152) and second (154) cutting portions, with the hole (146) positioned at a junction between these two portions. The first cutting portion is defined by a first cutting edge (158) and first rear portion (160), whereas the second cutting portion consists of a second cutting edge (162) and the rear portion (164). The first and second cutting edges extend longitudinally in opposite directions from the area (156) surrounding the hole 146. The first cutting edge (158) and the second rear portion (164) form the first exterior portion (148). The second cutting edge (162) and the first rear portion (160) define a second exterior portion (150).

Figure 9:
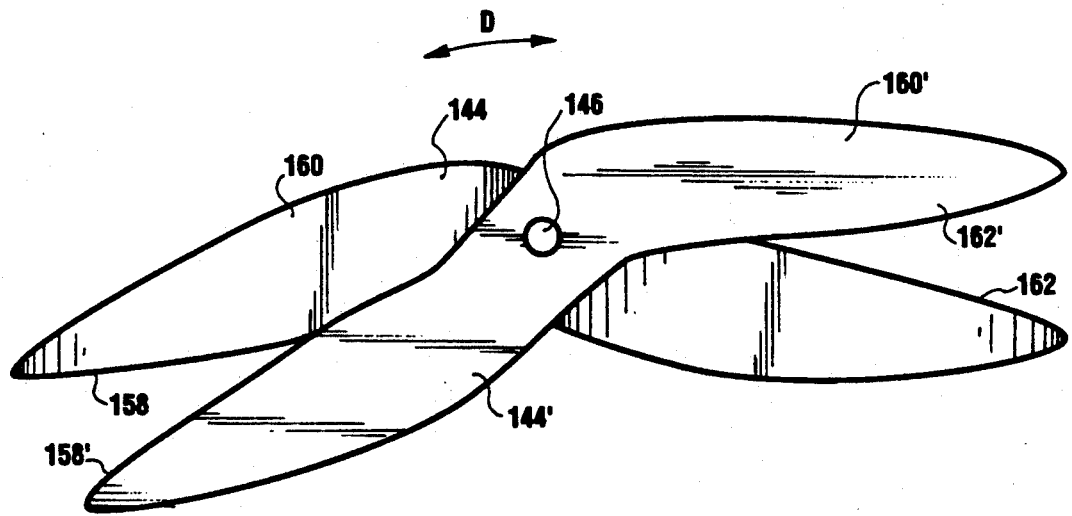
FIG. 9 shows the initial position of two blades coupled together for replacement.

The blades of FIGS. 8 and 9, can be provided with piercing portions illustrated in FIGS. 3a and 3b.

The cutting blade pockets of the offset metal cutting shears are formed to closely accommodate the corresponding blades. It is shown in FIG. 6 that when the blade is positioned within the receiving means (132), the first cutting edge (158) extends through the opening (140) to face the corresponding cutting edge of the second blade. The second cutting edge (162) as well as the whole second cutting portion (154) are positioned within the interior of the receiving means, so that the cutting edge (162) is protected by the flange (136). The first rear portion (160) of the blade forms a first bulge (184) which projects outwardly (see FIG. 8). In a similar fashion, the second rear portion (164) defines a second bulge (186) by extending outwardly from the longitudinal axis of the blade in the direction opposite to the direction of the first bulge. The cutting blade pockets of each movable member are provided with two concave areas which are designed to closely receive the first and second bulges of the blade. When the blade is positioned within the interior of the lever, engagement between the bulges and concave areas locks the blade within the receiving means, preventing it from sliding out. This creates an effective locking means.

The initial steps of the assembly procedure of the offset cutting shears are identical to the assembly previously discussed with reference to the shears of FIG. 1.

Figure 9A:
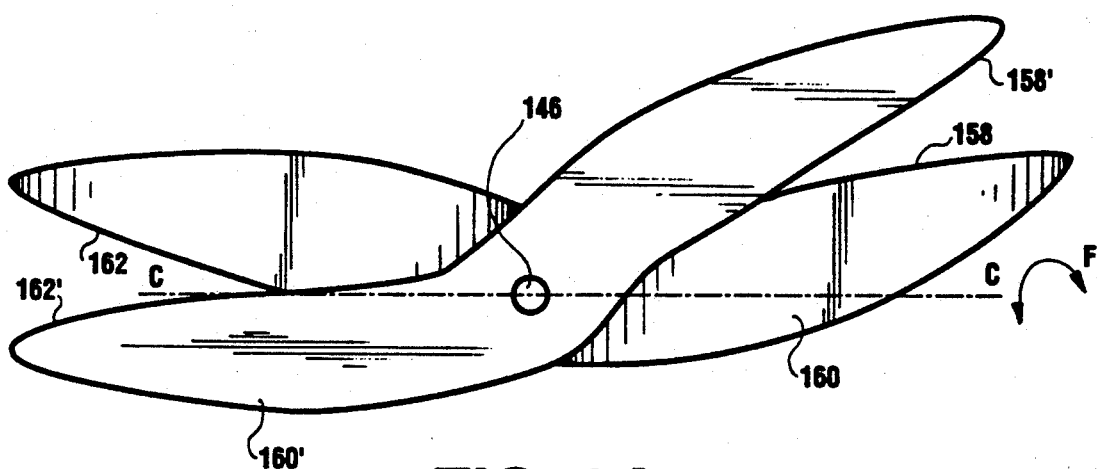
FIG. 9a shows an intermediate position of the blades coupled together during the replacement process.
Figure 9B:
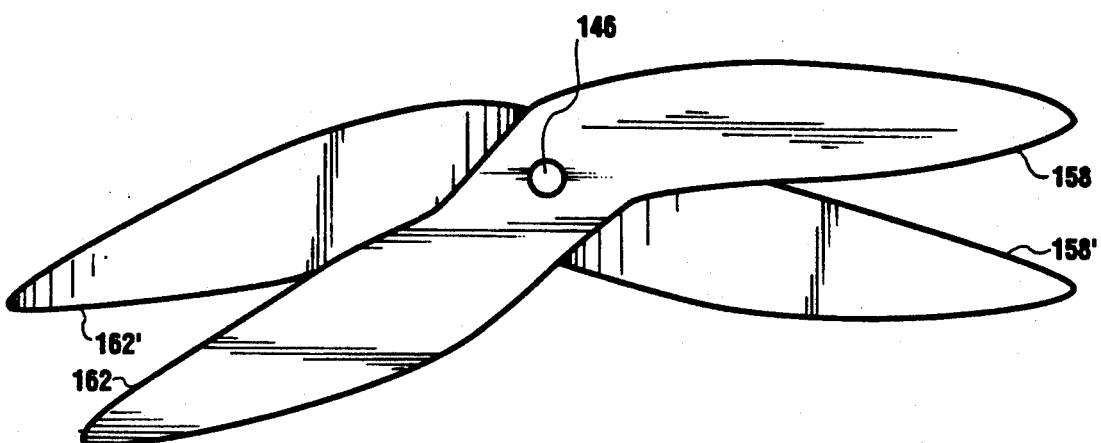
FIG. 9b shows the final position of the blades during the replacement process.

A novel concept of this invention allows substitution of the fresh, untouched cutting edges for the pair of cutting edges which become dull or ruined. To accomplish this task, the pivot pin (125) is removed and the shears are taken apart in order to gain access to the receiving means of the cooperating members. Then, the blades are released from their engagement with the receiving means of the levers (112) and (114) and positioned together outside the shears. One possible position of such blades is illustrated in FIG. 9 in which the edges (158) and (158') represent ruined cutting edges of the corresponding blades (144 and 144') which should be substituted for the fresh and unused cutting edges (162) and (162'). In order to do that, both blades are attached to each other as illustrated in FIG. 9, and rotated approximately 180° within the plane of the drawing, about an axis of the hole (146) in the direction of an arrow D. In the intermediate position, illustrated in FIG. 9a, the rear portions (160 and 160') are positioned below the cutting edges. Then, the blades coupled together are rotated 180° about a longitudinal axis C—C in the direction of an arrow F to a final position illustrated in FIG. 9b, at which position the blades can be placed within the corresponding receiving means of the movable members in such a manner that the fresh cutting edges (162 and 162') are exposed to a cutting action.

Figure 10:
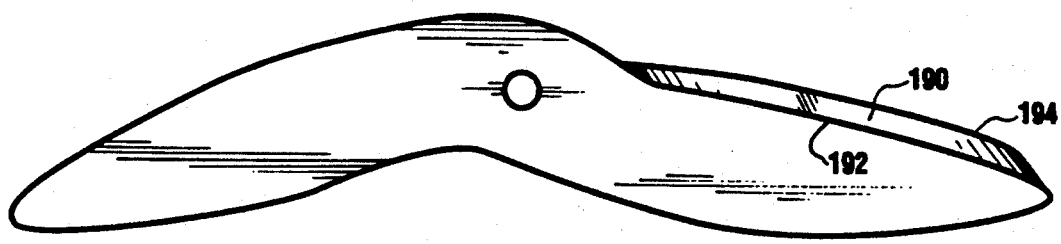
FIG. 10 illustrates a substantially thick cutting blade.

If the cutting surfaces of the blades are rather thin, then, the entire thickness of the cutting surface is ruined. However, if the blades in general and the cutting surfaces (190) thereof in particular are thick enough, as, for example, illustrated in FIG. 10, then only an edge (192) of the cutting surface which immediately engages the cut product, becomes dull or ruined. The other cutting edge (194) of the same cutting surface, which is not immediately exposed to the cutting process, remains sharp. Therefore, in the case of the thick cutting surface it is possible to replace one ruined or dull cutting edge of the same cutting surface by a fresh cutting edge thereof. This feature substantially increases the number of combinations used in the replacement process and extends the life span of the tool.

The levers of the metal cutting shears of the present invention are typically manufactured from a glass reinforced nylon or glass reinforced polycarbonate. However, any suitable lightweight strong material, either plastic or metal, is acceptable. For example, it is known in the industry to use a cast aluminum for the manufacture of levers. All materials used should be adequate enough to make the shears lighter in weight than the conventional steel shears, and at the same time, very strong. The cutting blades are typically manufactured from tool steel. However, any suitable strong material could be used for this purpose.

What is claimed:

1. A hand tool comprising two cooperating members, and interconnecting means, each said member having at least a jaw section and a handle, said interconnecting means being provided for interconnecting said members in mutually overlapping relationship so as to permit movement of said members relative to one another by said handles,
    at least one said jaw section having receiving means adapted to movably receive blade means, said receiving means being defined by at least an interior part thereof,
    said blade means comprising an elongated body having a central portion, first and second cutting portions, said first cutting portion defined by at least a first cutting edge and a first rear portion, said second cutting portion defined by at least a second cutting edge and a second rear portion, said first and said second cutting edges extending longitudinally and outwardly in opposite directions from said central portion,
    whereby said blade means being positioned within said receiving means in such a manner that said first cutting edge faces the other cooperating member and said second cutting edge faces said interior part of said receiving means.

2. A hand tool as claimed in claim 1, wherein said blade means has an opening for receiving said interconnecting means, said first and second cutting portions being symmetrical about an axis of the blade passing through the center of said opening.

3. A hand tool as claimed in claim 2, wherein the elongated body of said blade means further comprises first and second exterior portions positioned opposite to each other,
    said first cutting edge and said second rear portion define at least a part of said first exterior portion; and said second cutting edge and said first rear portion define at least a part of said second exterior portion.

4. A hand tool as claimed in claim 3, wherein said second exterior portion of the blade faces said interior part of said receiving means.

5. A hand tool as claimed in claim 3, wherein said blade means is positioned within said receiving means in such a manner that said second cutting edge is exposed to face the other cooperating member and said first cutting edge faces said interior part of said receiving means.

6. A hand tool as claimed in claim 1, wherein said first rear portion and said central portion form a first bulge means and said second rear portion and said central portion form a second bulge means, said receiving means having two concave areas adapted to closely receive said first and second bulge means.

7. A hand tool as claimed in claim 1, wherein each said cooperating member is provided with said jaw section having receiving means adapted to movably receive said blade means.

8. A hand tool as claimed in claim 7, wherein one said jaw section is positioned at an angle to the corresponding handle.

* * * * *